United States Patent [19]

van der Meulen

[11] 4,198,259

[45] Apr. 15, 1980

[54] APPARATUS FOR THE MANUFACTURE OF BAGS

[76] Inventor: Leonard van der Meulen, Immeuble Saadi el Menzah, Appt. 22A, 6$^{ieme}$ Etage Tour A., Tunis, Tunisia

[21] Appl. No.: 910,104

[22] Filed: May 30, 1978

[30] Foreign Application Priority Data

Jan. 6, 1977 [NL] Netherlands ......................... 7706026

[51] Int. Cl.$^2$ ...................... B31B 19/02; B31B 19/14; B31B 19/60
[52] U.S. Cl. .................................. 156/498; 93/33 H; 93/DIG. 1; 156/515; 156/553; 156/583.1; 156/583.5
[58] Field of Search ............... 156/515, 583, 497, 498, 156/553, 555, 583.1, 583.2, 583.5; 93/33 H, DIG. 1, 8 R

[56] References Cited

U.S. PATENT DOCUMENTS

| | | | |
|---|---|---|---|
| 3,052,282 | 9/1962 | Brückhaüser et al. | 156/515 |
| 3,083,757 | 4/1963 | Kraft et al. | 156/515 |
| 3,947,198 | 3/1976 | Hutt | 156/515 X |

FOREIGN PATENT DOCUMENTS

| | | | |
|---|---|---|---|
| 2621799 | 11/1976 | Fed. Rep. of Germany | 156/515 |
| 1054644 | 1/1967 | United Kingdom | 156/515 |

*Primary Examiner*—Michael G. Wityshyn
*Attorney, Agent, or Firm*—Ostrolenk, Faber, Gerb & Soffen

[57] ABSTRACT

Apparatus for the manufacture of bags from a web of plastic material while applying the principle of loop formation, comprising a plurality of supports, traveling in a first endless path said supports carrying and holding the web by means of suction, further comprising heat-sealing members moving in a second endless path, a part of which coincides with a portion of said first endless path for severing and heatsealing the web at spaced intervals so as to form bags, said supports with the bags passing through a cooling zone downstream of said common portion of both paths, said apparatus comprising means for taking the bags off from the supports.

12 Claims, 2 Drawing Figures

APPARATUS FOR THE MANUFACTURE OF BAGS

BACKGROUND OF THE INVENTION

The invention relates to an apparatus for the manufacture of bags from a web of thermoplastic material while applying the loop-formation principle, comprising a supply line for the web, a range of bearers for this web moving on in an endless circuit, which bearers also form an anvil each and a number of traveling welding devices which cooperate with the anvils on the bearers for cutting and heatsealing the web. Such an apparatus is described in, for instance, French Patent Specification No. 1.160.010.

Although this known apparatus has proved to operate very satisfactorily in practice, especially in the domain of household bags of thin-walled material, there is a great demand for a machine by which these bags can be manufactured at a high speed. Up to now, this high speed has always given rise to difficulties in connection with thin-walled plastic material, the handling of which is difficult.

SUMMARY OF THE INVENTION

The invention aims at providing an apparatus which meets the need referred to above. According to the invention, this purpose is achieved by a combination of the following features:

between the bearers one or more auxiliary supports are provided, these bearers and the auxiliary supports being provided with channels on the side directed towards the web, while these channels are connected periodically with a source of sub-atmospheric pressure, the welding devices are arranged on an endless circuit with a common track portion with respect to the circuit of the bearers, followed by a track portion for cooling the joint; and at the end of the latter track portion means are provided for the removal of the sub-atmospheric pressure in the channels of the bearers and for gripping the bags in a spot located next to the center so as to fold each bag, if necessary followed by a second folding operation.

By this combination of features, the web supplied is gripped at a large number of spots in the circuit of the bearers and the joints may get free from the anvils after the cutting and welding action, so that undisturbed cooling is caused which promotes the strength of the joint. As a result of the presence of the auxiliary supports, the well fastened bags continue moving on in the circuit.

The invention relates more particularly to a so-called "side-weld" machine for the manufacture of bags from a semi-tube whereby the circuit of the bearers extends according to a cylindric mantle, as described in the above mentioned French patent specification. In a favorable embodiment of this machine each welding device is carried out as a permanently heated prismatic beam one rib of which always serves for cutting the web and for heatsealing both edges, while the circuit of these beams is formed by a swiveling frame with a concave cylindric side in accordance to the common tract portion with the circuit of the bearers. Application of a swiveling frame has an additional advantage in case of a temporary standstill of the machine, as the welding circuit may be swiveled off and the permanently heated welding beams will not cause a burning of the plastic material.

Another advantage of the apparatus according to the invention and, more particularly, of the application of auxiliary supports consists in that a positive folding of the bags may take place in a known manner which prevents the two side-joints of each bag from contacting each other. This folded position facilitates the laying-off and stacking of the bags, especially in the case of a thin-walled foil.

SURVEY OF THE DRAWINGS

DESCRIPTION OF A PREFERRED EMBODIMENT

Figure 1:
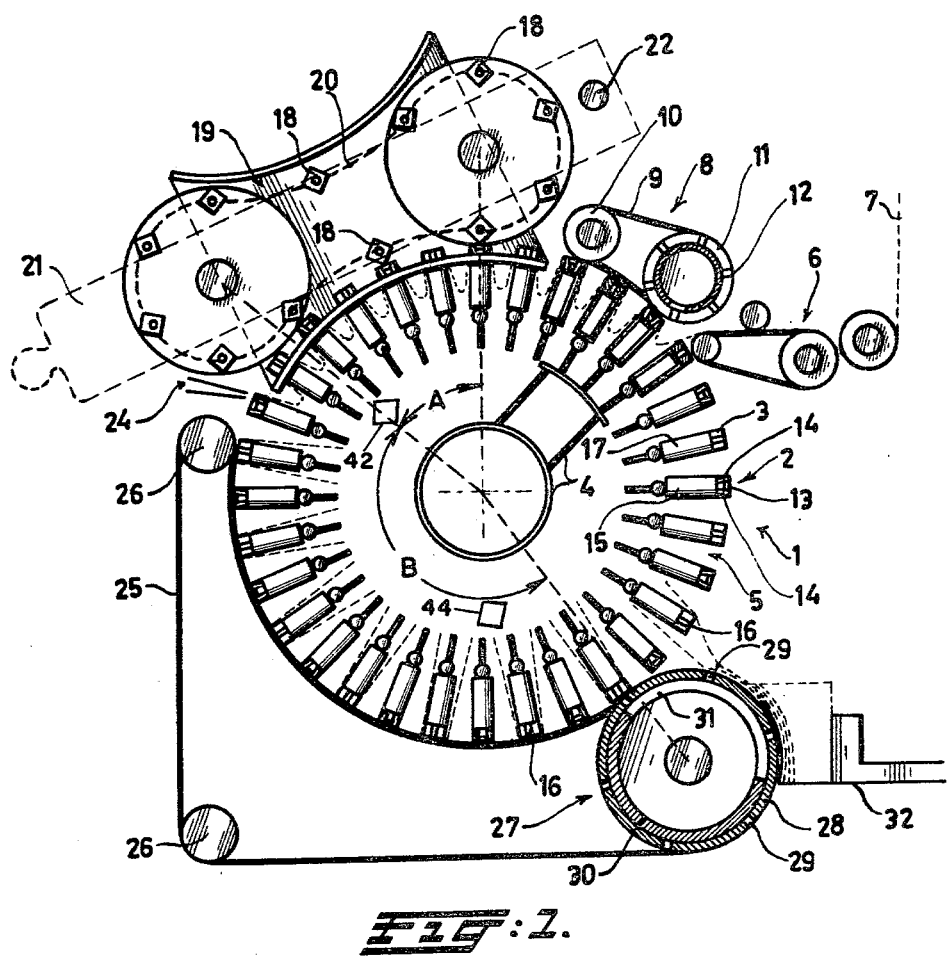
FIG. 1 is a vertical longitudinal section of the complete apparatus.

The apparatus consists of a drum-shaped element 1 with an imaginary cylindric mantle comprising a large number of radially arranged and alternating bearers 2 and auxiliary supports 3. The element 1 is arranged pivotaly around a central portion 4, so that the bearers 2 and auxiliary supports 3 move on in an endless (cylindric) circuit 5. The apparatus is further provided with a supply line 6 for a web 7 of thermoplastic sheet material. In a manner known as such, the velocity of supply of the web 7 by the supply line 6 is considerably higher than the velocity of the circuit 5 so that loops of the web 7 are formed. For the purpose of promoting this formation of loops, a pneumatic auxiliary device 8 is arranged near the supply line 6. This auxiliary device comprises a number of narrow endless belts 9 which are wound around two rollers 10 and 11. The latter roller is connected with a (not illustrated) source of compressed air while the roller 11 shows a number of holes 12 which, during the operation, are always directed toward the narrow free space left between the bearers 2 and the auxiliary supports 3.

On its outwardly directed face, each bearer 2 is provided with an anvil 13 and with two channels 14 on both sides thereof which lead to a box-shaped portion 15 of the bearer which may be connected with a source of sub-atmospheric pressure. The auxiliary supports 3 are also provided with a channel 16 forming a connection with a similar box-shaped portion 17. This box may be connected consecutively with the abovementioned source of sub-atmospheric pressure 40 and then with the source of compressed air as will be explained below.

Figure 2:
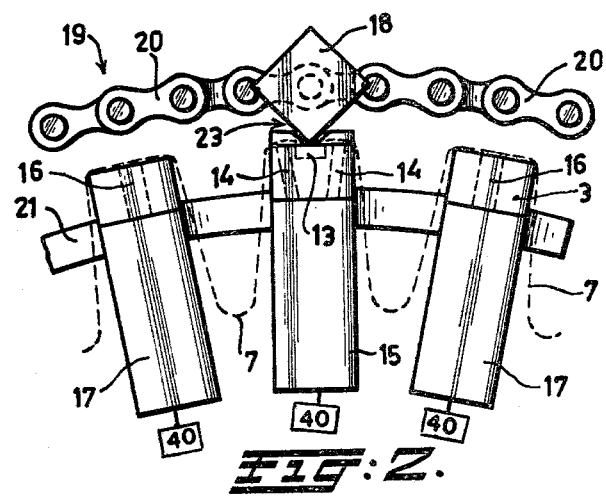
FIG. 2 shows on an enlarged scale a portion of the two circuits cooperating in a common track portion.

The apparatus is further provided with a number of traveling welding devices 18 each being embodied as a prismatic beam, in this case with a square cross-section. These welding beams 18 are arranged on an endless circuit 19 which is formed by, for instance, chains 20 which are guided along a frame 21. This frame is pivotal around a spindle 22 so that it can swivel with respect to the drum-shaped element 1. The circuit 19 of the welding beams 18 has a common track portion A with the circuit 5 of the bearers 2. In this track portion a rib of the welding beam 18 cooperates with the anvil 13 of the bearers 2 such that the plastic foil therebetween is cut and the ends are heatsealed by the permanently heated beam 18. The distance between the welding beams 18 corresponds to the distance between two adjacent bearers 2. The chains 20, which form the circuit 19, are guided accurately into the swiveling frame 21 for which purpose this frame is provided with a concave cylindric face along the track portion A. As can be seen from FIG. 2, the end of each bearer 2 is provided with a V-shaped supporting pad 23 in which the rib of each welding beam 18 fits.

At the end of the track portion A, means 42 is provided for removing the sub-atmospheric pressure in the box-shaped portions 15 and in the channels 14 of the bearers 2, upstream of the track portion B. Furthermore, a nozzle 24 is arranged for directing a current of air toward the loops of the web 7. Hereby the cut and welded edges are blown inwardly, as can be seen from FIG. 1. As a result thereof, the joints are no longer resting on the bearers 2, but they hang freely detached so that the joint will not be damaged. In the further track portion B of the circuit 5 the sub-atmospheric pressure in the box-shaped portions 17 of the auxiliary supports 3 is also eliminated by means 44. For the purpose of holding the detached pieces of foil (bags) hanging over the auxiliary supports 3, some endless belts 25 are wound around the outer circumference of the element 1, which belts are guided around some rollers 26 and a take-off roller 27. In this track portion, which occupies more than 90° of the cylindric track of the circuit 5, the welded sides may cool without an adhesion problem occuring.

The take-off roller 27 is formed by an outer case 28 comprising holes 29 along some generating lines of the case 28. This case pivots around a fixed core 30 which is connected with the source of sub-atmospheric pressure. This core has an open segment 31 so that the holes 29 may exercise a suction power during part of their movement along the core 30. The distance between the holes 29 in circumferential direction corresponds to the distance between two adjacent auxiliary supports 3. These holes 29 are not covered by the belts 25, but it is also possible to perforate these belts, so that the sucking action may be exercised through the belts. As soon as an auxiliary support 3 approaches the end of the cooling track and comes near the take-off roller 27, the box-shaped portion 17 is connected with the source of compressed air. The bag hanging over the auxiliary support 3 concerned may now be taken over from the circuit 5 by the suction power in the holes 29. This allows removal of the bag in folded condition from the drum-shaped element 1 and collection in a lay-off space 32. The latter is particularly favorable when treating thin plastic foil which, in folded condition, is more easily gripped and handled.

It is observed that the removal of the bags at the end of the cooling track B may also be done positively by a folding knife on the respective auxiliary supports 3 in cooperation with a clasp on the roller 27. By arranging this folding knife somewhat excentrically on the auxiliary support 3, the bag is not gripped in the middle and the side-joints do not contact each other. This prevents the possibility of adhesion. Folding may be repeated once more in order to give the bag a handy shape.

An important advantage of the apparatus according to the invention is the high production velocity as compared with the state of the art. A speed of manufacture of 1500 bags per minute may be easily achieved while maintaining the possibility of adjusting the size (width) of the bags, as desired. The application of the auxiliary supports 3 improves the positioning of the web 7 supplied and of the bags manufactured while also the laying-off shows advantages as set out above.

It is a further important advantage that the web 7 is not clamped upon the anvil 13 but that it is held thereon by suction power. As a result thereof the welding beam 18 may cut and weld the web without there occuring any tension in the welding area. This improves the quality of the joint made.

What is claimed is:

1. Apparatus for manufacturing bags from a web of thermoplastic material, comprising:
  a plurality of bearers for the web; means for moving said bearers over a pathway; each said bearer having an anvil on one side of said bearer for cooperating with a welding device;
  first reduced pressure means on each said bearer for communicating with the web as it engages said bearer, thereby for holding the web to said bearer;
  between neighboring said bearers, a respective auxiliary web support being provided; said auxiliary support also including one side thereof on which a web may rest;
  second reduced pressure means on each said auxiliary support for communicating with the web as it engages said auxiliary support, thereby for holding the web to said auxiliary support;
  means for feeding web material to said bearers toward the upstream end of said pathway; and for feeding web material at a rate for causing a web to be deposited on said bearers and on said auxiliary supports with tension free loops of web material developing between neighboring said bearers and auxiliary supports;
  a plurality of welding devices, each for cooperating with a respective said anvil, for cutting and welding the web; welding device moving means for bringing said welding devices to their respective said anvils in a welding section located downstream in said pathway from the initial contact of the web and said bearers and for moving said welding devices off said anvils at the end of said welding section;
  said pathway further including a cooling section downstream in said pathway of said welding section;
  bag removal means downstream of said cooling section in said circuit for removing bags still supported upon said auxiliary supports.

2. The apparatus of claim 1, wherein the bag removal means comprises along the circuit of the bearers a moving take-off device cooperating with the auxiliary supports for carrying off the bags manufactured in partially folded condition.

3. The apparatus of claim 1 further comprising means for discontinuing operation of said first reduced pressure means for each said bearer before the passage of that said bearer through said cooling section is completed.

4. The apparatus of claim 3 further comprising means for discontinuing operation of said second reduced pressure means for each said auxiliary support prior to said bag removal means engaging each bag for removing that bag from its said auxiliary support.

5. The apparatus of either of claims 1 or 3, wherein said first reduced pressure means comprises a first channel in each said bearer communicating with said one side of said bearer that is engaged by the web and comprises first means for delivering reduced pressure to said first channel; and
  said second reduced pressure means comprises a second channel in each said auxiliary support, communicating with said one side of said auxiliary support that is engaged by the web and comprises second means for delivering reduced pressure to said second channel.

6. The apparatus of any of either of claims 1 or 3, wherein said pathway through said welding section comprises a circuit that is generally convexly cylindrical, with said anvils being directed outwardly;

said welding device moving means comprise a swivelable frame having a concavely, generally cylindrical side the shape of which corresponds to said cylindrical shape of said circuit pathway in said welding section; said swivelable frame being swivelable to have the said cylindrical shapes mate or to have the said cylindrical shapes be separated;

said welding device for each said anvil comprising a permanently heated, prismatic shaped beam having one rib thereof oriented for cooperating with the respective said anvil to cut the web and to heat seal the cut edges of the web; said welding device moving means including a second circuit pathway for moving said beam over the cylindrical said welding section of said circuit pathway and then away from said pathway of said auxiliary supports.

7. The apparatus of claim 6, wherein the welding beams are fixed to chains which form the circuit and which chains are guided accurately into the swiveling frame.

8. The apparatus of claim 6, wherein said one sides of the bearers are provided with a V-shaped supporting pad in which the rib of each welding beam fits.

9. The apparatus of claim 1, wherein said feeding means feeds said web at a speed greater than the speed of said bearers as caused by said bearer moving means.

10. The apparatus of claim 1, wherein said welding device moving means moves each said welding device along a common pathway along with said pathway of the respective said anvil through said welding section.

11. The apparatus of claim 10, wherein said bearers and said auxiliary supports are in a common, endless, first circuit which is said pathway;

said welding device moving means comprises said welding devices being in a second endless circuit which includes said common pathway.

12. The apparatus of either of claims 10 or 11, wherein said circuit pathway through said welding section is generally convexly cylindrical, with said anvils directed outwardly;

said welding device moving means comprise a swivelable frame having a concavely, generally cylindrical side the shape of which corresponds to said cylindrical shape of said circuit pathway in said welding section; said swivelable frame being swivelable to have the said cylindrical shapes mate or to have the said cylindrical shapes be separated;

said welding device for each said anvil comprising a permanently heated, prismatic shaped beam having one rib thereof oriented for cooperating with the respective said anvil to cut the web and to heat seal the cut edges of the web; said welding device moving means moving said beam over said common pathway.

* * * * *